United States Patent
Gellerich et al.

(10) Patent No.: US 11,099,851 B2
(45) Date of Patent: Aug. 24, 2021

(54) BRANCH PREDICTION FOR INDIRECT BRANCH INSTRUCTIONS

(71) Applicant: International Business Machines Corporation, Armonk, NY (US)

(72) Inventors: Wolfgang Gellerich, Boeblingen (DE);
Peter M. Held, Renningen (DE);
Gerrit Koch, Ammerbuch (DE);
Martin Schwidefsky, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 16/171,590

(22) Filed: Oct. 26, 2018

(65) Prior Publication Data

US 2020/0133678 A1    Apr. 30, 2020

(51) Int. Cl.
| | | |
|---|---|---|
| *G06F 7/38* | (2006.01) | |
| *G06F 9/00* | (2006.01) | |
| *G06F 9/44* | (2018.01) | |
| *G06F 9/38* | (2018.01) | |
| *G06F 9/30* | (2018.01) | |

(52) U.S. Cl.
CPC .......... *G06F 9/3844* (2013.01); *G06F 9/3012* (2013.01); *G06F 9/30047* (2013.01); *G06F 9/30058* (2013.01)

(58) Field of Classification Search
CPC ............... G06F 9/3844; G06F 9/30047; G06F 9/30058; G06F 9/3012
USPC ........................................................ 712/239
See application file for complete search history.

(56) References Cited

U.S. PATENT DOCUMENTS

| | | | |
|---|---|---|---|
| 8,464,028 B2* | 6/2013 | Serebrin | G06F 9/45537 703/26 |
| 8,555,040 B2 | 10/2013 | Beaumont-Smith et al. | |
| 8,612,731 B2* | 12/2013 | Cavanna | G06F 9/30058 712/238 |

(Continued)

OTHER PUBLICATIONS

Adrian Florea et al., "Advanced Techniques for Improving Indirect Branch Prediction Accuracy," http://webspace.ulbsibiu.ro/lucian.vintan/html/Latvia.pdf. pp. 10.

(Continued)

*Primary Examiner* — Chun Kuan Lee
(74) *Attorney, Agent, or Firm* — Cantor Colburn LLP; Steven Chiu

(57) ABSTRACT

Examples of techniques for branch prediction for indirect branch instructions are described herein. An aspect includes detecting a first register setting instruction in an instruction pipeline of a processor, wherein the first register setting instruction stores a target instruction address in a first register of the processor. Another aspect includes looking up the first register setting instruction in a first table. Another aspect includes, based on there being a hit for the first register setting instruction in the first table, determining instruction address data corresponding to a first indirect branch instruction that is associated with the first register setting instruction in a first entry in the first table. Another aspect includes updating a branch prediction for the first indirect branch instruction in a branch prediction logic of the processor based on the target instruction address.

17 Claims, 5 Drawing Sheets

(56) References Cited

U.S. PATENT DOCUMENTS

| | | |
|---|---|---|
| 9,678,755 B2 | 6/2017 | Abdallah |
| 2011/0078425 A1 | 3/2011 | Shah et al. |
| 2015/0046690 A1 | 2/2015 | Eickemeyer et al. |
| 2017/0315810 A1 | 11/2017 | Eickemeyer et al. |
| 2019/0166158 A1* | 5/2019 | Grocutt ............... H04L 63/1416 |
| 2020/0081716 A1* | 3/2020 | Yalavarti ............... G06F 9/3806 |

OTHER PUBLICATIONS

Oliverio J. Santana et al., "A Comprehensive Analysis of Indirect Branch Prediction," http://citeseerx.ist.psu.edu/viewdoc/download;jsessionid=70C427A4E00EB48FB3C88D3DCBC3F779? doi=10.1.1.77.8061&rep=rep1&type=pdf. 2002 pp. 134-145.

Walid J. Ghandour et al., "Leveraging Dynamic Slicing to Enhance Indirect Branch Prediction," https://ieeexplore.ieee.org/document/6974696. Dec. 4, 2014 pp. 3.

* cited by examiner

BRANCH PREDICTION FOR INDIRECT BRANCH INSTRUCTIONS

BACKGROUND

The present techniques relate to processors. More specifically, the techniques relate to branch prediction for indirect branch instructions in processors.

Branch prediction is a technique used in processors to accelerate the execution of software. Based on tracking the behavior of a repeatedly executed branch instruction, the future behavior of the branch instruction may be predicted, i.e. which path will be taken when the condition of the branch instruction is resolved. Instructions in the predicted path may be speculatively executed by the processor before the branch instruction is resolved. If the branch prediction turns out to be incorrect when the condition of the branch instruction is resolved, the speculatively executed instructions are flushed, and a performance comparable to idling results. If the branch prediction is correct, the speculatively executed instructions are committed, resulting in significant performance gains in the computer processor.

SUMMARY

According to an embodiment described herein, a system can include a processor to detect a first register setting instruction in an instruction pipeline of the processor, wherein the first register setting instruction stores a target instruction address in a first register of the processor. The processor can look up the first register setting instruction in a first table. The processor can, based on there being a hit for the first register setting instruction in the first table, determine instruction address data corresponding to a first indirect branch instruction that is associated with the first register setting instruction in a first entry in the first table. The processor can update a branch prediction for the first indirect branch instruction in a branch prediction logic of the processor based on the target instruction address.

According to another embodiment described herein, a method can include detecting a first register setting instruction in an instruction pipeline of the processor, wherein the first register setting instruction stores a target instruction address in a first register of the processor. The method can further include looking up the first register setting instruction in a first table. The method can further include, based on there being a hit for the first register setting instruction in the first table, determining instruction address data corresponding to a first indirect branch instruction that is associated with the first register setting instruction in a first entry in the first table. The method can further include updating a branch prediction for the first indirect branch instruction in a branch prediction logic of the processor based on the target instruction address According to another embodiment described herein, an apparatus can include hardware logic to detect a first register setting instruction in an instruction pipeline of the processor, wherein the first register setting instruction stores a target instruction address in a first register of the processor. The processor can look up the first register setting instruction in a first table. The processor can, based on there being a hit for the first register setting instruction in the first table, determine instruction address data corresponding to a first indirect branch instruction that is associated with the first register setting instruction in a first entry in the first table. The processor can update a branch prediction for the first indirect branch instruction in a branch prediction logic of the processor based on the target instruction address.

DETAILED DESCRIPTION

Figure 1:
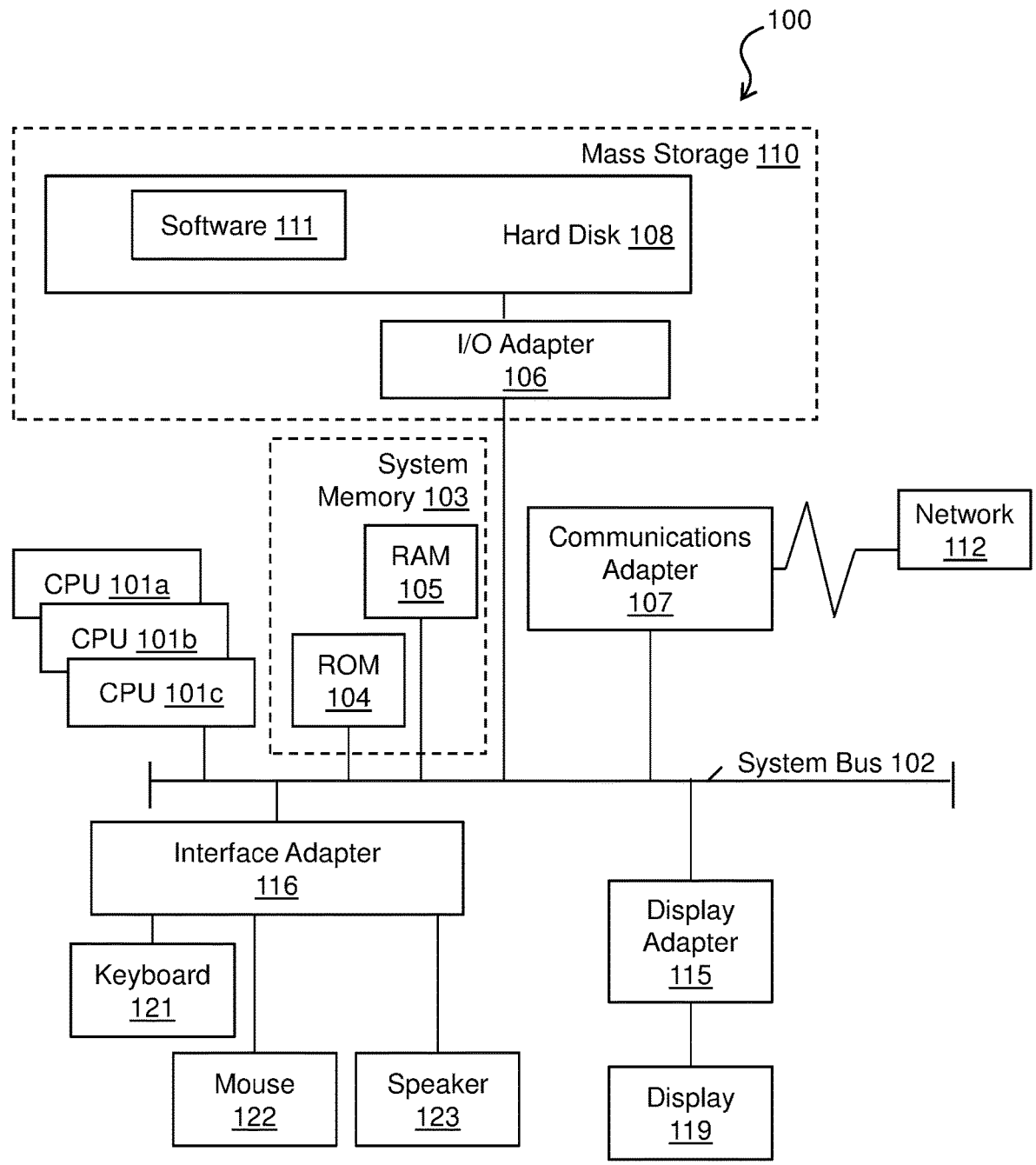
FIG. 1 is a block diagram of an example computer system for branch prediction for indirect branch instructions.

Embodiments of branch prediction for indirect branch instructions are provided, with exemplary embodiments being discussed below in detail. An indirect branch instruction is a type of program control instruction that, rather than specifying the next instruction to execute, specifies a register. The contents of the register give the instruction address that is the target of the branch instruction. Information on instruction addresses that are loaded into registers may be used to predict the target of an indirect branch instruction. Program execution time may be reduced by reducing the number of mispredicted indirect branch instructions, because mispredicted branches may cause the instruction pipeline to run empty and start again at the new target instruction address, which may waste execution cycles.

Indirect branch instructions may be used, for example, to implement function call-backs, dynamic dispatching in object-oriented languages, and for returning from function calls. Some library functions may return to different locations, making it difficult for branch prediction logic to predict the branch target. An example source code snippet including a register load instruction and an indirect branch is given below in Table 1:

TABLE 1

LoadAddr: LOAD R1:= TargetAddr
.
.
.
BranchAddr: BRANCH (R1)

As shown in Table 1, the LOAD at instruction address LoadAddr loads a target instruction address (TargetAddr) into register R1 in the processor. The indirect BRANCH at BranchAddr then uses the contents of register R1 as its target instruction address and redirects the control flow to TargetAddr.

An instruction address may be loaded into a register in any appropriate manner in various embodiments. For example, on zSystems, the instruction "BRASL R14, StartAddr" (Branch and Store Long) may be used for subprogram calls. This example BRASL instruction loads the return address (StartAddr) into register R14 and is handled like a LOAD. The called subprogram may later execute an indirect branch to jump to the address found in register R14.

Embodiments of branch prediction for indirect branch instructions may maintain two tables in the processor. A first table, referred to herein as Table T, may include a single entry for each register in the processor in some embodiments. Whenever a register is set in the processor, instruction address data corresponding to the register setting instruction is written into the register's respective table entry in Table T. For the example code snippet in Table 1 above, upon executing the LOAD at LoadAddr, a value corresponding to LoadAddr may be written into the entry for register R1 in Table T. Each entry in Table T may hold, in various embodiments, the full instruction address of the register setting instruction, or a hash derived from the instruction address of the register setting instruction.

A second table, referred to herein as Table L, may hold entries including instruction address data corresponding to register setting instructions from Table T. Each register setting instruction in Table L is associated with instruction address data corresponding to an indirect branch instruction that uses the same register as the register setting instruction. In the code example of Table 1, upon executing the BRANCH at BranchAddr, the instruction address data of the register setting instruction that is associated with register R1 in Table T (i.e., LoadAddr), is read from the entry for register R1 in Table T, and written into an entry Table L associated with instruction address data of the BRANCH instruction, i.e., BranchAddr, that uses the same register R1. In some embodiments of Table L, the instruction address data of the register setting instruction may be a full instruction address or a hash derived from the instruction address. In some embodiments of Table L, the instruction address data of the branch instruction may be a full instruction address or a hash derived from the instruction address.

When a register setting instruction is executed, the register setting instruction is searched in Table L. If instruction address data for the register setting instruction is found in Table L, the indirect branch instruction associated with the register setting instruction in Table L and the target instruction address that is loaded into the register by the register setting instruction are provided to the branch prediction logic of the processor. The branch prediction logic may update the predicted target of the indirect branch instruction that is associated with the register setting instruction in Table L based on the target instruction address. For example, a notification may be sent to the branch prediction logic to update an entry for BranchAddr in a branch prediction table to indicate that TargetAddress is the predicted target of BranchAddr the next time BranchAddr is executed.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others.

As shown in FIG. 1, the computer system 100 has one or more central processing units (CPU(s)) 101a, 101b, 101c, etc. (collectively or generically referred to as processor(s) 101). The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110. A software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein with reference to FIGS. 2-5. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1.

Figure 2:
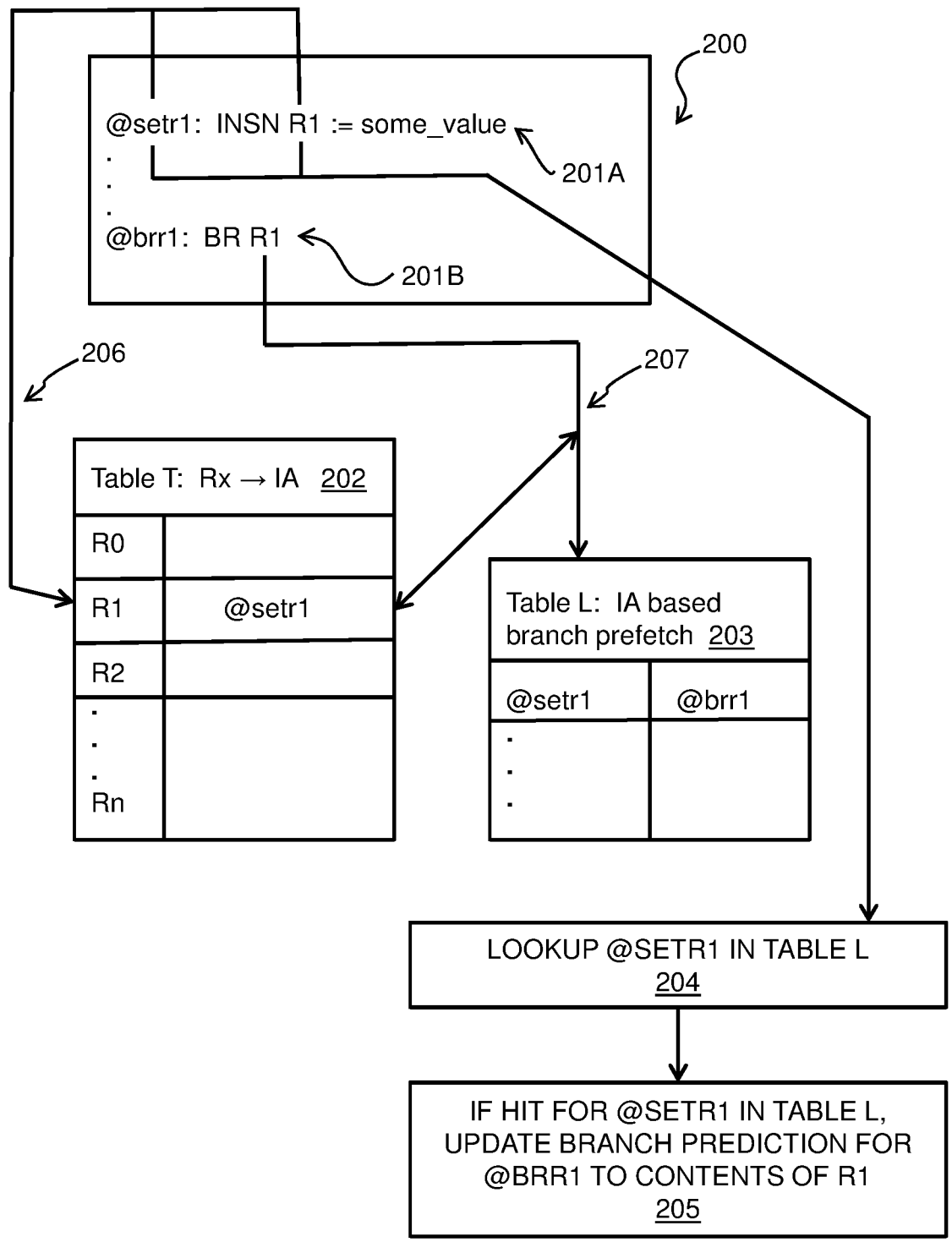
FIG. 2 is a block diagram of an example system for branch prediction for indirect branch instructions.

FIG. 2 illustrates a block diagram of an example system 200 for branch prediction for indirect branch instructions. System 200 may be implemented in any suitable computer processor, such as any of CPUs 101a-c of FIG. 1. FIG. 2 shows an example register setting instruction 201A that has an instruction address @setr1, and an example indirect branch instruction 201B that has an instruction address @brr1, that are being processed in the computer processor. System 200 includes a Table T 202, which includes a respective entry for each register (e.g., registers R1 to Rn) in the computer processor. Each entry in Table T 202 holds instruction address data corresponding to the last register setting instruction that stored a target instruction address to the associated register. For example, as shown in FIG. 2, @setr1 is the last register setting instruction that stored a target instruction address to register R1 (i.e., some_value was stored in register R1 by instruction 201A). In various embodiments, the instruction address data corresponding to the register setting instructions that are stored in Table T 202 may be full instruction addresses, or hashes derived from the full instruction addresses. In some embodiments, the hash function that is used to derive instruction address data corresponding to register setting instructions for storage in Table T may omit leading address bits; for computer code that does not use the full address range such a hash function will not cause collisions in the branch prediction logic. The target instruction address that is stored in a register may be a full instruction address.

System 200 further includes a Table L 203. Table L 203 associates instruction address data corresponding to register setting instructions with instruction address data corresponding to indirect branch instructions that use the same register. As shown in FIG. 2, register setting instruction address @setr1 is associated with indirect branch instruction address @brr1 in Table L 203, because instruction 201A sets register R1 and 201B uses register R1. The entry for register setting instruction 201A is set in Table L the first time indirect branch instruction 201B is executed, based on looking up the entry for register R1 in Table T 202 via logic 207 and determining @setr1 from register R1's entry in Table T 202. In various embodiments, the instruction address data corresponding to the register setting instructions that are stored in Table L 203 may be full instruction addresses, or hashes derived from the full instruction addresses; the instruction address data corresponding to the register setting instructions in Table L 203 may have the same format as the instruction address data corresponding to the register setting instructions that are stored in Table T 202. In various embodiments, the instruction address data corresponding to the indirect branch instructions that are stored in Table L 203 may be full instruction addresses, or hashes derived from the full instruction addresses. In embodiments where a hash function is used for the instruction address data corresponding to the indirect branch instructions, the hash function may be selected to correspond to a hash function that is used in the branch prediction logic of the processor.

When register setting instruction 201A is processed in the computer processor, logic causes a store 206 of the instruction address data @setr1 to register R1's entry in Table T 202. For executions of register setting instruction 201A, @setr1 is looked up in Table L 203, as shown in logic block 204. If there is a hit in Table L 203 for @setr1, the branch prediction for the associated indirect branch instruction (i.e., @brr1) is updated in the branch prediction logic of the processor based on the target instruction address that was loaded into register R1 by the register setting instruction @setr1, as shown in logic block 205. In some embodiments, a hash derives from the full instruction address of the indirect branch instruction (which was stored in Table L) is provided to the branch prediction logic of the processor. The full instruction address of the target instruction address may be provided to the branch prediction logic of the processor.

In some embodiments of software including indirect branch instructions, a subprogram may have more than one exit. Table 2 below shows an example source code snippet for a subprogram with two exits:

TABLE 2 addr0: BRASL R14, addr1
addr1: ...
addr2: BRC addr4
addr3: BR (R14)
addr4: ...
addr5: BR (R14)

As shown in Table 2, the conditional branch (BRC) at addr2 may cause either the BR (R14) at addr3 or the BR(R14) at addr5 to be executed. In such an embodiment, Table L 203 may associate a register setting instruction address data with instruction address data for more than one indirect branch instruction address (e.g., addr0 may be associated with both addr3 and addr5 in Table L 203 for the example of Table 2). The branch prediction logic in the processor may have information on how the conditional branch at addr2 typically behaves, and may be able to predict the target of conditional branch instruction addr2 with a good hit rate.

It is to be understood that the block diagram of FIG. 2 is not intended to indicate that the system 200 is to include all of the components shown in FIG. 2. Rather, the system 200 can include any appropriate fewer or additional components not illustrated in FIG. 2. Further, Table T 202 and Table L 203 may each have any appropriate number of entries and fields within those entries, and be located in any appropriate memory in the processor, for example, a cache memory.

Embodiments of branch prediction for indirect branch instructions may interface with synchronous branch prediction starting when a branch instruction occurs, relatively early in the pipeline. For embodiments including asynchronous branch prediction, the branch prediction logic may have an input channel through which the branch prediction logic receives information from the execution unit about branch instructions that have completed. Another dedicated input channel to the branch prediction logic may be provided from the logic for branch prediction for indirect branch instructions in some embodiments. The branch instruction address is used to determine whether an indirect branch has already been predicted. If the indirect branch has not yet been predicted by the branch prediction logic (because, for example, the indirect branch is far ahead in the code), the branch prediction logic uses the target instruction address provided by the logic for branch prediction for indirect branch instructions. If the branch has already been predicted by the branch prediction logic, the branch prediction logic may compare whether the predicted target address matches the target address provided by the logic for branch prediction for indirect branch instructions. If they match, the prediction is good. However, if the addresses do not match, the predicted branch may be searched in a list of announced branches. If the branch is found in the list of announced branches, the prediction for the branch is corrected and all announcements after the branch may be removed. If the branch is not found in the list of announced branches, the wrong announcement may have already led to instruction fetching. In this case, a flush may be triggered. An embodiment of branch prediction for indirect branch instructions that may be interfaced with an asynchronous branch prediction system is discussed below with respect to FIG. 3.

Figure 3:
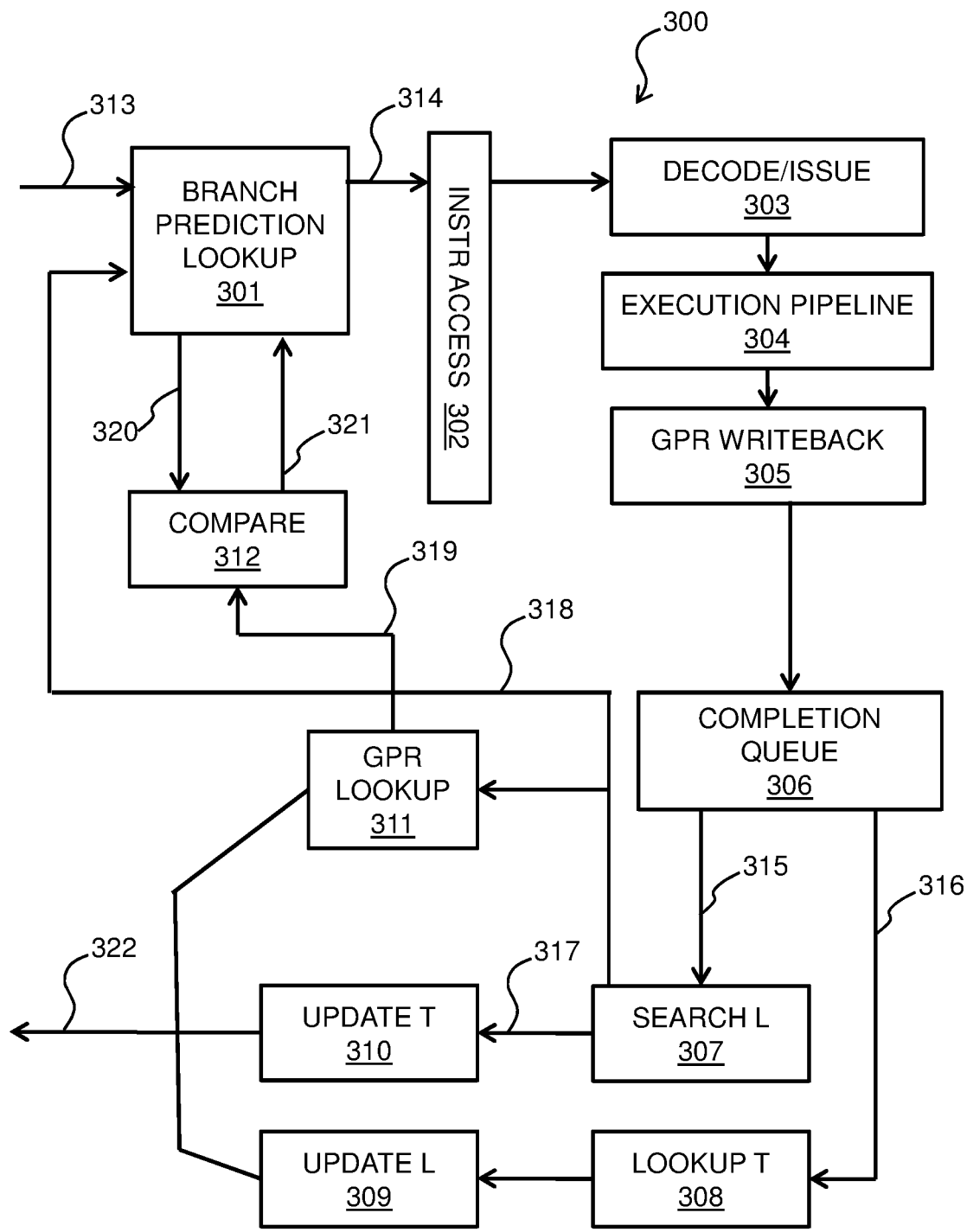
FIG. 3 is a block diagram of an example system for branch prediction for indirect branch instructions.

FIG. 3 illustrates a block diagram of an example system 300 for branch prediction for indirect branch instructions. System 300 may be implemented in any suitable computer processor, such as any of CPUs 101a-c of FIG. 1, and operates in conjunction with a Table T 202 and Table L 203 as shown in FIG. 2. System 300 includes a branch prediction logic, including branch prediction lookup 301; a fetch stage, including instruction access 302; a decode/issue/execute stage including decode/issue logic 303, execution pipeline 304, and general purpose register (GPR) writeback 305; and a completion stage including completion queue 306. In system 300 of FIG. 3, the branch prediction lookup 301 receives instruction address data corresponding to branch instructions on lookup input 313. The branch prediction lookup 301 outputs predicted targets for the branch instructions to instruction access 302 via prediction output 314. The instruction access 302 issues branch instructions with predictions to the decode/issue logic 303 and the branch instructions proceed through the execution pipeline 304 and GPR writeback 305 to completion queue 306.

When there is a register setting instruction in the completion queue 306, a command 315 is issued to Table L search logic 307 to look up the register setting instruction in Table L 203. Command 315 includes the instruction address of the register setting instruction, and an identifier of the register that is set by the register setting instruction. If the Table L search logic 307 determines that there is a hit for the register setting instruction in Table L 203, logic 318 provides the instruction address data of the indirect branch instruction associated with the register setting instruction in Table L 203, and the register that was set by the register setting instruction, to the GPR lookup 311 and the branch prediction lookup 301. The branch prediction lookup 301 receives the instruction address data of the indirect branch instruction and outputs the predicted target address 320 for the indirect branch instruction to compare logic 312. The GPR lookup 311 determines the target instruction address that is currently held in the register that was set by the register setting instruction, and provides that target instruction address via logic 319 to compare logic 312. The compare logic 312 compares the target instruction address from the GPR lookup 311 to the predicted target address 320 provided by the branch prediction lookup 301. If there is a mismatch in compare logic 312, the branch prediction for the indirect branch instruction is updated in the branch prediction lookup 301 via input 321 based on the target instruction address from the GPR lookup 311.

Independent of the result in the Table L search logic 307, logic 317 causes the entry in Table T 202 for the register that was set by the register setting instruction associated with command 315 to be updated by Table T update logic 310 with instruction address data corresponding to the register setting instruction (e.g., the full instruction address, or a hash of the instruction address, in various embodiments). Flow then proceeds to completion 322.

If there is an indirect branch instruction in completion queue 306, a command 316 is issued to Table T lookup logic 308. Command 316 includes the register that is used by the indirect branch instruction, and instruction address data corresponding to the indirect branch instruction. Table T lookup logic 308 provides instruction address data corresponding to the register setting instruction associated with the register designated in command 316 that is stored in Table T 202 to Table L update logic 309. Table L update logic 309 updates the entry in Table L 203 that holds instruction address data of the register setting instruction with instruction address data corresponding to the indirect branch instruction that triggered command 316. Flow then proceeds to completion 322.

It is to be understood that the block diagram of FIG. 3 is not intended to indicate that the system 300 is to include all of the components shown in FIG. 3. Rather, the system 300 can include any appropriate fewer or additional components not illustrated in FIG. 3.

Figure 4:
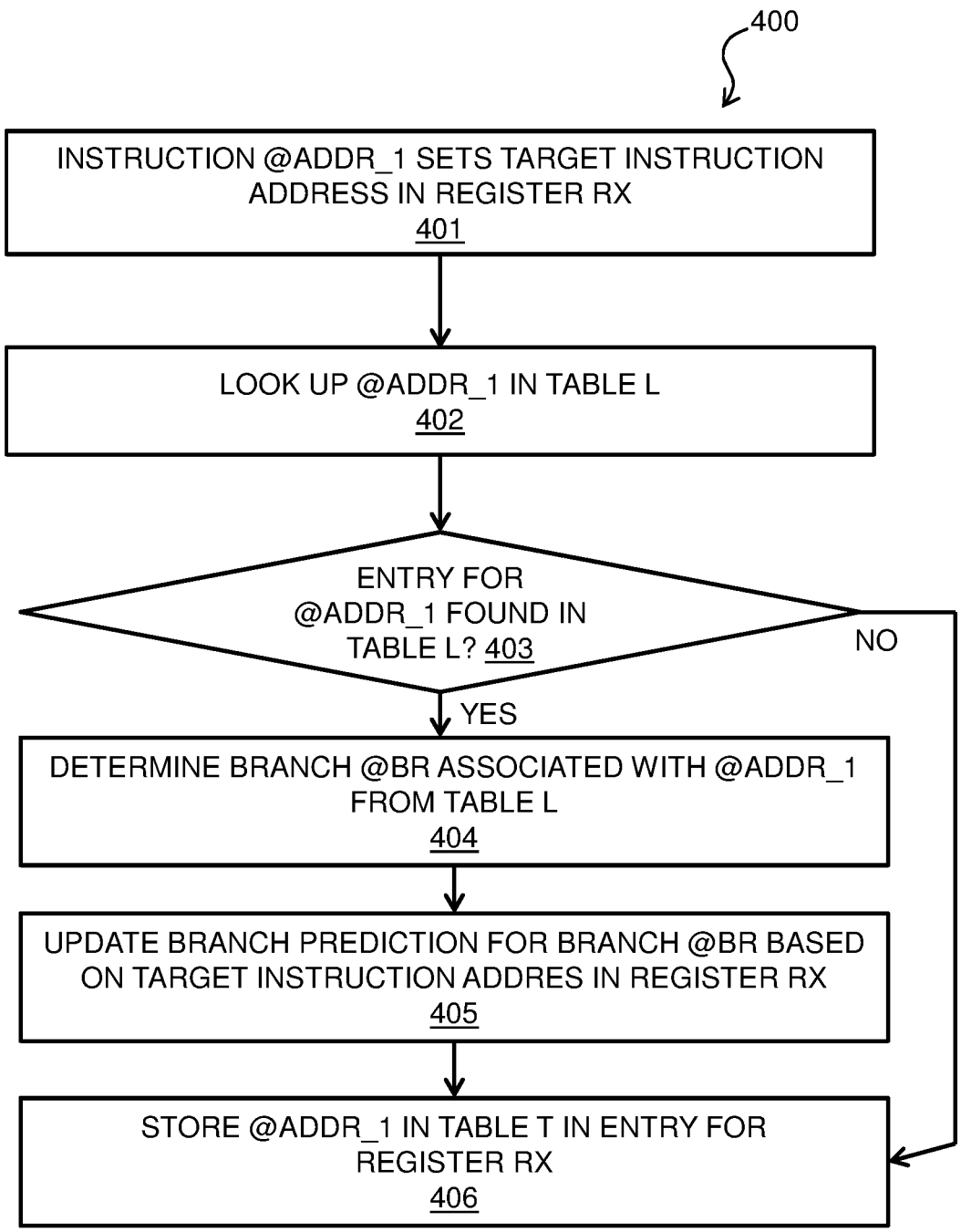
FIG. 4 is a process flow diagram of an example method for branch prediction for indirect branch instructions.

FIG. 4 is a process flow diagram of an example method for branch prediction for indirect branch instructions. The method 400 can be implemented with any suitable computing device, such as any of CPUs 101a-c in the computer system 100 of FIG. 1. Method 400 may be implemented in any of system 200 of FIG. 2 or system 300 of FIG. 3, and operates in conjunction with the Table T 202 and Table L 203 as shown in FIG. 2.

In block 401, a register setting instruction having an instruction address @Addr_1 sets a register Rx with a target instruction address. Next, in block 402, @Addr_1 is looked up in Table L 203. It is determined in block 403 whether an entry for @Addr_1 was found in Table L 203. If it is determined in block 403 that an entry for @Addr_1 was found in Table L 203, flow proceeds from block 403 to block 404, in which the @Addr_1's associated branch instruction address @BR is determined from the found entry in Table L 203. Next, in block 405, the branch prediction for the associated branch instruction @BR is updated in the branch prediction logic of the computer processor based on the target instruction address that was loaded in register Rx by @Addr_1. Therefore, when the indirect branch instruction @BR is encountered, the branch prediction logic may predict that the target of @BR is the target instruction address that was set in register Rx by @Addr_1. In various embodiments, the full instruction address, or a hash of the instruction address, of @BR is provided to the branch prediction logic. The full instruction address of the target instruction address may also be provided to the branch prediction logic.

Flow then proceeds from block 405 to block 406, in which @Addr_1 is stored in the entry for register Rx in Table T 202. If it was determined in block 403 that no entry was found in Table L 203 for @Addr_1, flow proceeds from block 403 directly to block 406, in which @Addr_1 is stored in the entry for register Rx in Table T 202, and the branch prediction logic is not updated. In some embodiments, the full instruction address of @Addr_1 may be stored in Table T 202 in block 406, while in other embodiments, a hash derived from the full instruction address of @Addr_1 may be stored in Table T 202 in block 403. In embodiments in which the computer code that contains @Addr_1 does not use the full address range, leading bits may be omitted from the instruction address data corresponding to @Addr_1 in Table T 206.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
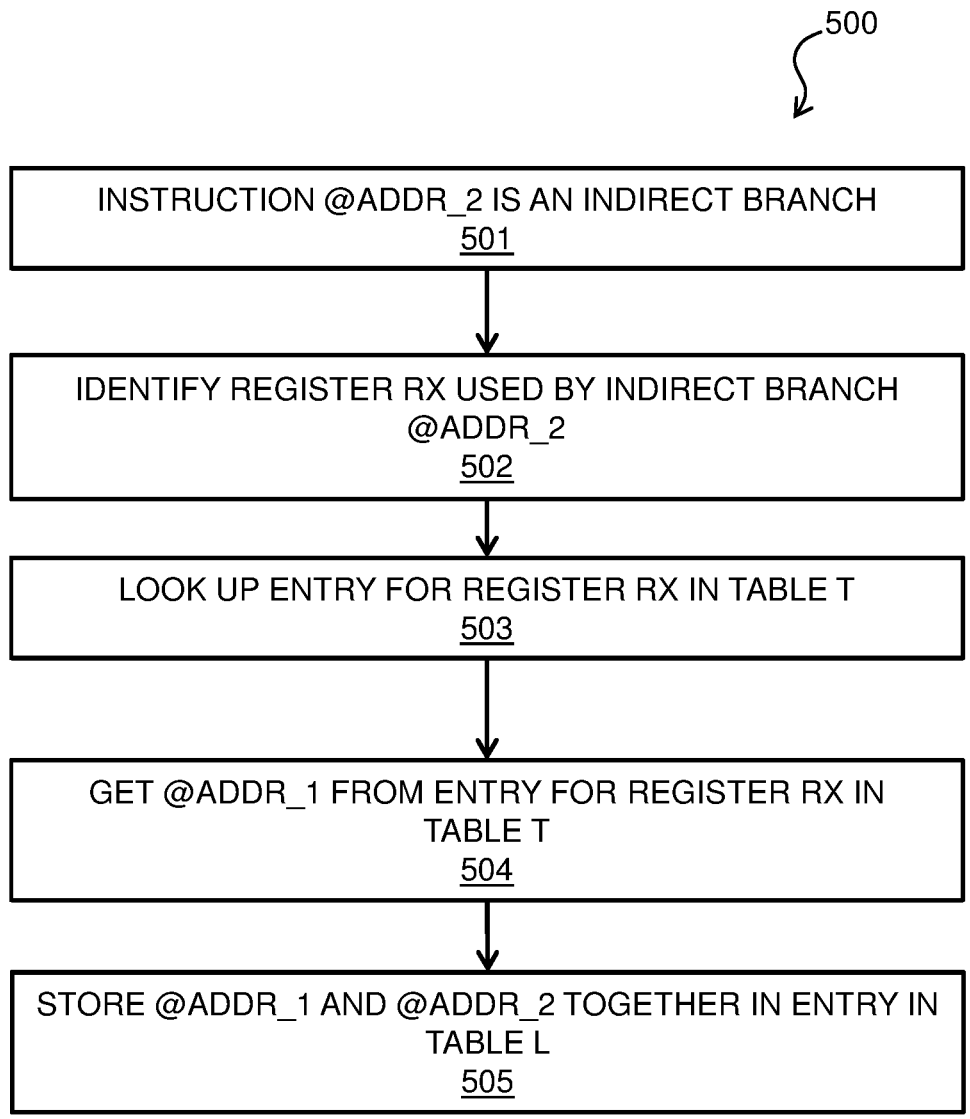
FIG. 5 is a process flow diagram of another example method for branch prediction for indirect branch instructions.

FIG. 5 is a process flow diagram of an example method for branch prediction for indirect branch instructions. The method 500 can be implemented with any suitable computing device, such as any of CPUs 101a-c in the computer system 100 of FIG. 1. Method 500 may be implemented in any of system 200 of FIG. 2 or system 300 of FIG. 3, and operates in conjunction with the Table T 202 and Table L 203 as shown in FIG. 2.

At block 501, a branch instruction identified by the instruction address @Addr_2 is identified as an indirect branch instruction in the processor pipeline. In block 502, the register Rx that specifies the target instruction address of the indirect branch instruction is identified. In block 503, Table T 202 is searched for register Rx. In block 504, @Addr_1 is determined from the entry for register Rx in Table T; @Addr_1 is the register setting instruction that last set register Rx. In block 505, @Addr_1 and @Addr_2 are stored together in Table L 203. If there is already an entry for @Addr_1 in Table L 203, that entry may be updated with instruction address data for @Addr_2 in block 505. If there is not already an entry for @Addr_1 in Table L 203, a new entry may be created that holds @Addr_1 associated with @Addr_2 in block 505. In some embodiments, the full instruction address of @Addr_1 may be stored in Table L 203 in block 505, while in other embodiments, a hash derived from the full instruction address of @Addr_1 may be stored in Table L 203 in block 505. In embodiments in which the computer code that contains @Addr_1 does not use the full address range, leading bits may be omitted from the instruction address data corresponding to @Addr_1 in Table L 203. In some embodiments, the full instruction address of @Addr_2 may be stored in Table L 203 in block 505, while in other embodiments, a hash derived from the full instruction address of @Addr_2 may be stored in Table L 203 in block 505. In embodiments in which a hash of @Addr_2 is stored in Table L 203, the hash function that is used to derive the hash may correspond to a hash function that is used in the branch prediction logic of the computer processor.

The process flow diagram of FIG. 5 is not intended to indicate that the operations of the method 500 are to be executed in any particular order, or that all of the operations of the method 500 are to be included in every case. Additionally, the method 500 can include any suitable number of additional operations. Method 400 of FIG. 4 and method 500 of FIG. 5 may operate in parallel in the computer processor during the processing of instructions in the processor pipeline. Method 400 of FIG. 4 may be triggered in the computer processor whenever a register setting instruction is encountered in the pipeline, and method 500 of FIG. 5 may be triggered whenever an indirect branch instruction is encountered in the pipeline.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
detecting a first register setting instruction in an instruction pipeline of the processor, wherein the first register setting instruction stores a target instruction address in a first register of the processor;
look up the first register setting instruction in a first table;
based on there being a hit for the first register setting instruction in the first table, determine instruction address data corresponding to a first indirect branch instruction that is associated with the first register setting instruction in a first entry in the first table;
update a branch prediction for the first indirect branch instruction in a branch prediction logic of the processor based on the target instruction address;
store instruction address data corresponding to the first register setting instruction in a first entry in a second table, the first entry in the second table being associated with the first register;
detect a second indirect branch instruction in the instruction pipeline of the processor;
identify a second register that is used by the second indirect branch instruction;
look up the second register in the second table;
determine instruction address data corresponding to a second register setting instruction that is associated with the second register in a second entry in the second table; and
store a second entry in the first table, the second entry in the first table including instruction address data corresponding to the second register setting instruction associated with instruction address data corresponding to the second indirect branch instruction.

2. The system of claim 1, wherein the instruction address data corresponding to the first indirect branch instruction in the first entry in the first table comprises a hash derived from a full instruction address of the first indirect branch instruction.

3. The system of claim 2, wherein the hash derived from the full instruction address of the first indirect branch instruction is based on a hash function that corresponds to a hash function that is used in the branch prediction logic of the processor.

4. The system of claim 1, wherein the instruction address data corresponding to the first register setting instruction in the first entry in the second table comprises a hash derived from a full instruction address of the first register setting instruction.

5. The system of claim 1, wherein the target instruction address is a full instruction address.

6. The system of claim 1, wherein the second table comprises a plurality of entries, and wherein each entry in the second table is associated with a respective register of a plurality of registers in the processor.

7. A computer-implemented method, comprising:
detecting a first register setting instruction in an instruction pipeline of a processor, wherein the first register setting instruction stores a target instruction address in a first register of the processor;
looking up the first register setting instruction in a first table;
based on there being a hit for the first register setting instruction in the first table, determining instruction address data corresponding to a first indirect branch instruction that is associated with the first register setting instruction in a first entry in the first table;
updating a branch prediction for the first indirect branch instruction in a branch prediction logic of the processor based on the target instruction address;
storing instruction address data corresponding to the first register setting instruction in a first entry in a second table, the first entry in the second table being associated with the first register;

detecting a second indirect branch instruction in the instruction pipeline of the processor;

identifying a second register that is used by the second indirect branch instruction;

looking up the second register in the second table;

determining instruction address data corresponding to a second register setting instruction that is associated with the second register in a second entry in the second table; and storing a second entry in the first table, the second entry in the first table including instruction address data corresponding to the second register setting instruction associated with instruction address data corresponding to the second indirect branch instruction.

8. The computer-implemented method of claim 7, wherein the instruction address data corresponding to the first indirect branch instruction in the first entry in the first table comprises a hash derived from a full instruction address of the first indirect branch instruction.

9. The computer-implemented method of claim 8, wherein the hash derived from the full instruction address of the first indirect branch instruction is based on a hash function that corresponds to a hash function that is used in the branch prediction logic of the processor.

10. The computer-implemented method of claim 7, wherein the instruction address data corresponding to the first first register setting instruction in the first entry in the second table comprises a hash derived from a full instruction address of the first register setting instruction.

11. The computer-implemented method of claim 7, wherein the target instruction address is a full instruction address.

12. The computer-implemented method of claim 7, wherein the second table comprises a plurality of entries, and wherein each entry in the second table is associated with a respective register of a plurality of registers in the processor.

13. An apparatus, comprising hardware logic configured to:

detect a first register setting instruction in an instruction pipeline of a processor, wherein the first register setting instruction stores a target instruction address in a first register of the processor;

look up the first register setting instruction in a first table;

based on there being a hit for the first register setting instruction in the first table, determine instruction address data corresponding to a first indirect branch instruction that is associated with the first register setting instruction in a first entry in the first table;

update a branch prediction for the first indirect branch instruction in a branch prediction logic of the processor based on the target instruction address;

store instruction address data corresponding to the first register setting instruction in a first entry in a second table, the first entry in the second table being associated with the first register;

detect a second indirect branch instruction in the instruction pipeline of the processor;

identify a second register that is used by the second indirect branch instruction;

look up the second register in the second table;

determine instruction address data corresponding to a second register setting instruction that is associated with the second register in a second entry in the second table; and store a second entry in the first table, the second entry in the first table including instruction address data corresponding to the second register setting instruction associated with instruction address data corresponding to the second indirect branch instruction.

14. The apparatus of claim 13, wherein the instruction address data corresponding to the first indirect branch instruction in the first entry in the first table comprises a hash derived from a full instruction address of the first indirect branch instruction.

15. The apparatus of claim 14, wherein the hash derived from the full instruction address of the first indirect branch instruction is based on a hash function that corresponds to a hash function that is used in the branch prediction logic of the processor.

16. The apparatus of claim 13, wherein the instruction address data corresponding to the first first register setting instruction in the first entry in the second table comprises a hash derived from a full instruction address of the first register setting instruction.

17. The apparatus of claim 13, wherein the second table comprises a plurality of entries, and wherein each entry in the second table is associated with a respective register of a plurality of registers in the processor.

* * * * *